Patented Feb. 17, 1942

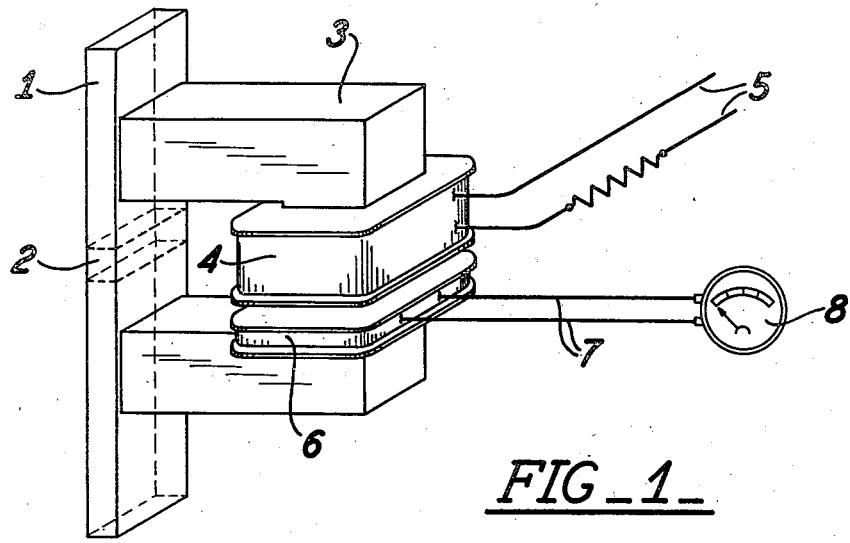
FIG_1_
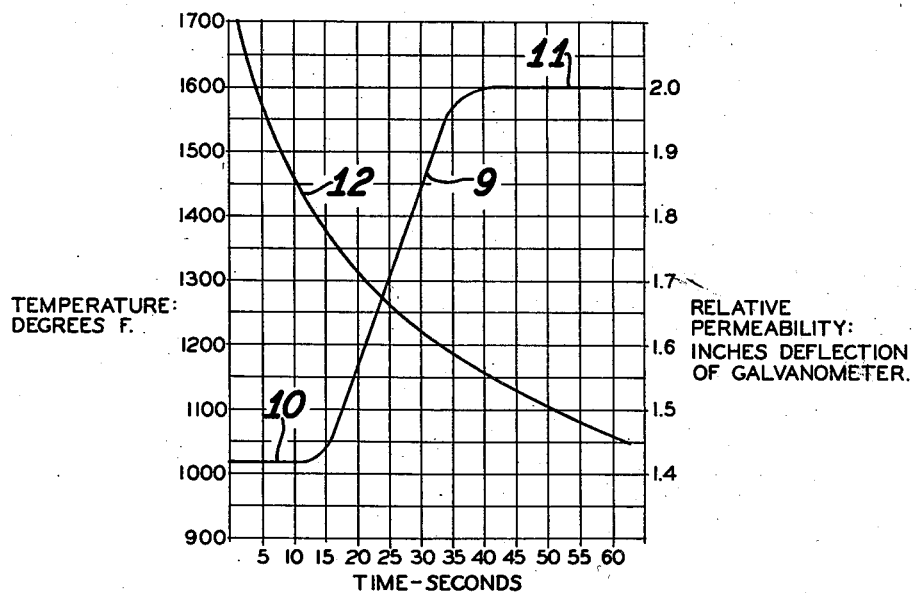
FIG_2_

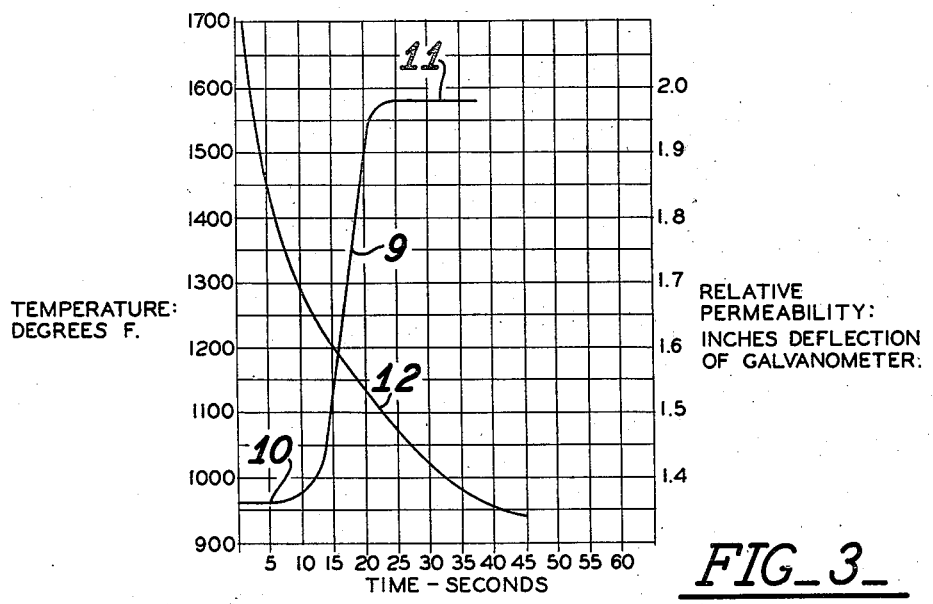
FIG_3_
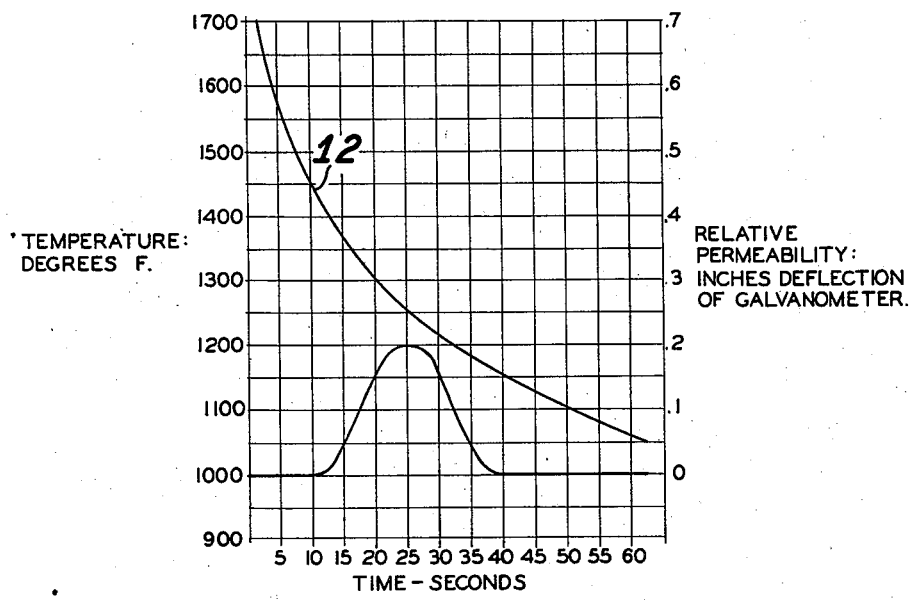
FIG_4_

2,273,086

UNITED STATES PATENT OFFICE 2,273,086

METHOD OF COOLING WELD JOINTS

William A. Bruce, Tulsa, Okla., assignor to Standard Oil Development Company, a corporation of Delaware Application August 12, 1939, Serial No. 289,934

1 Claim. (Cl. 148—21.5)

The present invention is directed to a method of cooling a weld joint. More particularly, the present invention is concerned with a method for determining the earliest safe moment for quenching a weld.

In many fields of work where welding is employed the nature of the work requires that the welded joint be quenched at the earliest possible moment. For example, in the welding of casing for the completion of an oil well each joint, as it is welded, must be moved downwardly to make room for the next joint. Since the drill hole during this operation is filled with drilling fluid the weld is quenched when it is moved downwardly. Naturally efficient progress of the work makes it desirable to advance each joint as soon as possible after the completion of the weld. Much difficulty has been encountered, however, by the fact that premature quenching leads to weak joints and ruptures. Heretofore the welder has had no way of knowing just when quenching could be safely done. As a result the tendency has been to unduly delay the advancing of welded joints.

The present invention is based on a recognition of the fact that during the cooling of steel a physical transformation occurs which alters the crystalline structure of the metal. This transformation may vary with different alloys but in general it is a transformation from a metal of low tensile strength to one of high tensile strength. This transformation occurs at different temperature levels, depending upon the temperature to which the metal has been heated and the rate of cooling. A change in the rate of cooling may change the point at which the transformation is complete by as much as a few hundred degrees Fahrenheit.

It has now been discovered that the magnetic permeability of the metal changes during this transformation in a very pronounced manner. According to the present invention, therefore, the proper time for quenching the metal is determined by observing the magnetic permeability of the welded joint. It has been found that during the aforesaid transformation the magnetic permeability of the metal changes from one value to another distinct value and that quenching can be safely done the moment this change is completed.

The present invention is practiced by the use of a simple apparatus for determining when the aforesaid transformation is completed. Briefly, this apparatus comprises a magnetic circuit of which the welded joint is made a part, means for setting up a magnetic flux in the circuit and means for observing changes in the density of the magnetic flux, as caused by changes in permeability.

The present invention will be better understood from the following detailed description of the accompanying drawings in which—

Fig. 1 is a diametric projection of the apparatus used for the practice of the present invention in test position;

Fig. 2 is a graph showing the change in magnetic permeability with time and with a decreasing temperature;

Fig. 3 is a similar graph showing the change in permeability with time with a greater cooling rate than that shown in Fig. 2, and Fig. 4 is a similar graph showing changes in permeability with time when direct current is employed.

Referring to the drawings in detail, numeral 1 designates a piece of metal having a welded joint 2. A U-shaped magnet 3 has its pole pieces on either side of the welded joint and is provided with an exciting coil 4, the leads 5 of which are connected to a suitable source of power, and with a testing coil 6, the leads 7 of which are connected to a suitable meter 8.

The ends of the pole pieces can, if desired, be made to conform to the curvature of the metal 1 to which it is applied. In practice, however, these pole pieces are very small so that their ends fit flush against the metal regardless of its curvature. The power supply can be either D. C. or A. C. In the former case the meter 8 will be a direct current meter, such as a volt meter or a recording galvanometer. In the latter case the meter 8 will be an A. C. meter of the same type.

In the practice of the present invention the weld is completed and before cooling has begun or advanced substantially the pole pieces are arranged on either side of the weld. Current is supplied to the exciting coil and the meter is observed. If alternating current is employed, the meter 8 will read a constant value for the first part of the cooling, as shown in Figs. 2 and 3. When the cooling reaches the point at which chemical transformation begins the reading of the meter changes and increases constantly during continued cooling until the transformation is complete when the meter again shows a constant value higher than the initial value. The changes in permeability in Figs. 2 and 3 are shown by curve 9, the flat portion 10 being the reading before the transformation began and the flat portion 11 being the reading after the completion of the transformation. It will be noted that the permeability curve is steeper in Fig. 3 than in Fig. 2. This is because the cooling curve 13 is also steeper. As soon as the second constant reading is attained the welded joint can be quenched without danger.

In Fig. 4 is shown the type of meter reading which is obtained when direct current is employed. In this case, while the magnetic permeability of the test piece remains constant, there is no changing flux and, therefore, no deflection of the meter. When the magnetic permeability of the test piece begins to change, there is a change in magnetic flux which sets up a current due to an induced E. M. F. in the test coil circuit and causes a deflection of the meter. In this case the completion of the transformation is indicated by a return of the meter to zero reading. If desired, the meter can be adjusted so as to give a positive reading at its zero point. The D. C. apparatus has the added advantage that, if a high enough field is used, the magnet will tend to hold itself firmly in position during the test.

An examination of Figs. 2 to 4 reveals that the present invention does not depend for its operability upon the temperature at which changes in the test piece occur. The testing apparatus is automatic in the sense that it reveals the occurrence of a transformation in the test piece regardless of the temperature at which this transformation occurs and regardless of the rate of cooling. Thus it can be understood that the objective of the present invention could not be attained by mere measurement of the temperature adjacent the weld because this temperature is not at all indicative of the extent of the transformation of the physical properties of the metal of the joint. By the use of the apparatus of the present invention the operator can ignore such factors as temperature and rate of cooling and reduce the determination of the proper time to quench to the mere observation of a meter.

The nature and objects of the present invention having been thus described and illustrated, what is claimed as new and useful and is desired to be secured by Letters Patent is:

In the cooling of a weld joint between steel pieces the steps of setting up a magnetic circuit, including the joint, while the joint is still substantially at welding temperatures, cooling the joint in air, observing the change in magnetic permeability of the joint during cooling, and quenching the joint when the change is complete.

WILLIAM A. BRUCE.